United States Patent
Vossberg et al.

(10) Patent No.: US 8,555,500 B2
(45) Date of Patent: Oct. 15, 2013

(54) METHOD OF PRODUCING OR REPAIRING TURBINE OR ENGINE COMPONENTS, AND A COMPONENT, NAMELY A TURBINE OR ENGINE COMPONENT

(75) Inventors: Andreas Vossberg, Isernhagen (DE); Hans Joachim Rösler, Braunschweig (DE); Sebastian Piegert, Lübbenan (DE)

(73) Assignee: MTU Aero Engines GmbH, Munich (DE)

( * ) Notice: Subject to any disclaimer, the term of this patent is extended or adjusted under 35 U.S.C. 154(b) by 456 days.

(21) Appl. No.: 12/303,880

(22) PCT Filed: May 31, 2007

(86) PCT No.: PCT/DE2007/000971
§ 371 (c)(1),
(2), (4) Date: Jul. 21, 2010

(87) PCT Pub. No.: WO2007/140748
PCT Pub. Date: Dec. 13, 2007

(65) Prior Publication Data
US 2010/0291405 A1    Nov. 18, 2010

(30) Foreign Application Priority Data
Jun. 8, 2006   (DE) .......................... 10 2006 026 704

(51) Int. Cl.
*B23K 1/00*    (2006.01)
*F01D 5/00*    (2006.01)
*F01D 25/00*   (2006.01)

(52) U.S. Cl.
USPC ..................... 29/889.1; 29/888.011; 228/119; 228/233.2

(58) Field of Classification Search
None
See application file for complete search history.

(56) References Cited

U.S. PATENT DOCUMENTS

| | | | |
|---|---|---|---|
| 4,288,247 A | 9/1981 | Shaw | |
| 4,381,944 A | 5/1983 | Smith, Jr. et al. | |
| 4,830,934 A | 5/1989 | Ferrigno et al. | |
| 5,156,321 A | 10/1992 | Liburdi et al. | |
| 5,193,272 A * | 3/1993 | Wortmann et al. | .......... 29/889.1 |

(Continued)

FOREIGN PATENT DOCUMENTS

| | | | |
|---|---|---|---|
| GB | 2 153 845 A | | 8/1985 |
| WO | WO 2005/054528 | * | 6/2005 |
| WO | WO 2007/060230 A1 | | 5/2007 |

OTHER PUBLICATIONS

Hoppe, Barbara; Behavior of Brazing Nickel-Based Super Alloys Undergoing Thermo-mechanical Fatigue Loading; 2003, Thesis, Technical University Carolo-Wilhelmina zu Braunschweig, pp. 1-3.

*Primary Examiner* — John J Zimmerman
(74) *Attorney, Agent, or Firm* — Greer, Burns & Crain, Ltd.

(57) ABSTRACT

A method of producing or repairing single-crystalline turbine or engine components by the following steps: heating of braze filler metal to a temperature which is greater than or equal to the melting temperature of the braze filler metal; introducing the molten mass of the braze filler metal produced through the heating process into a crack formed in the turbine or engine component, or into the gap formed between two turbine or engine components, or into a damaged area of a turbine or engine component; and non-isothermal control or regulation of the temperature of the braze filler metal or turbine or engine component during an epitaxic solidification process of the braze filler metal.

7 Claims, 2 Drawing Sheets

(56) References Cited

U.S. PATENT DOCUMENTS

| | | |
|---|---|---|
| 5,240,490 A | 8/1993 | Moore |
| 5,240,491 A | 8/1993 | Budinger et al. |
| 5,437,737 A | 8/1995 | Draghi et al. |
| 5,666,643 A | 9/1997 | Chesnes et al. |
| 5,732,467 A | 3/1998 | White et al. |
| 6,050,477 A | 4/2000 | Baumann et al. |
| 6,325,871 B1 | 12/2001 | Burke et al. |
| 6,454,885 B1 | 9/2002 | Chesnes et al. |
| 6,503,349 B2 | 1/2003 | Pietruska et al. |
| 6,508,000 B2 | 1/2003 | Burke et al. |
| 6,530,971 B1 | 3/2003 | Cohen et al. |
| 6,629,368 B2 | 10/2003 | Schnell et al. |
| 6,968,991 B2 | 11/2005 | Renteria et al. |
| 8,034,154 B2 * | 10/2011 | Singer et al. .................... 75/255 |
| 8,141,769 B2 * | 3/2012 | Ott et al. ....................... 228/119 |
| 2002/0157737 A1 | 10/2002 | Chesnes et al. |
| 2002/0185198 A1 | 12/2002 | Pietruska et al. |
| 2005/0067065 A1 * | 3/2005 | Fernihough et al. .......... 148/512 |
| 2005/0120941 A1 * | 6/2005 | Hu et al. .......................... 117/1 |
| 2005/0205174 A1 * | 9/2005 | Konter et al. ................. 148/562 |
| 2007/0175546 A1 | 8/2007 | Hoppe et al. |
| 2007/0228108 A1 * | 10/2007 | Goldschmidt et al. ........ 228/119 |
| 2008/0083748 A1 * | 4/2008 | Thyssen et al. ............... 219/678 |
| 2009/0255981 A1 | 10/2009 | Singer et al. |
| 2010/0193574 A1 * | 8/2010 | Cretegny et al. ........... 228/234.1 |

\* cited by examiner

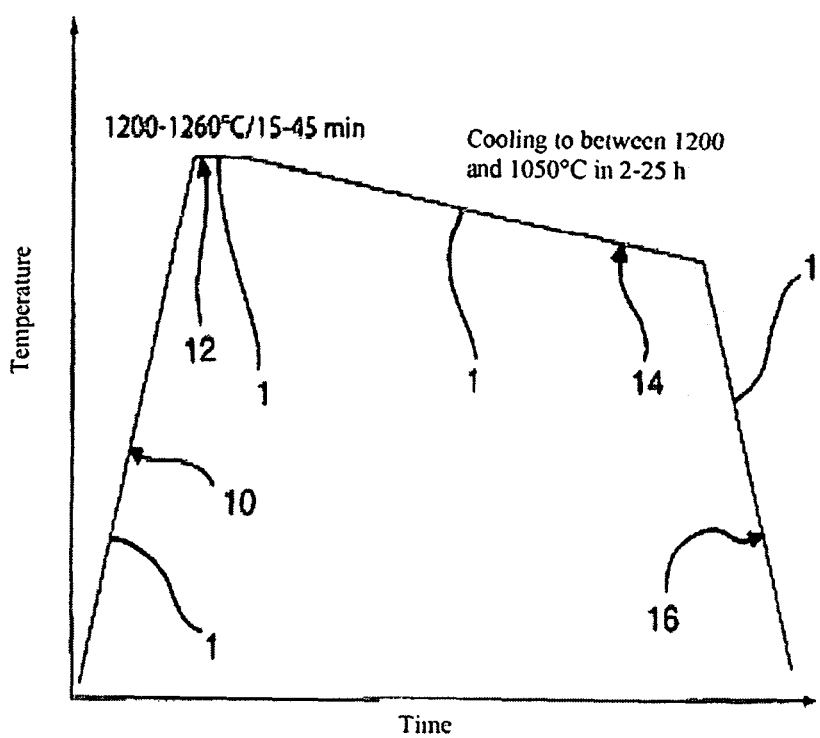

METHOD OF PRODUCING OR REPAIRING TURBINE OR ENGINE COMPONENTS, AND A COMPONENT, NAMELY A TURBINE OR ENGINE COMPONENT

The invention relates to a method for producing or repairing turbine or engine components, and a component, namely a turbine or engine component.

BACKGROUND

From U.S. Pat. No. 5,732,467 a method for repairing surface cracks is known, whereas the substrate consisting of a superalloy features a directionally solidified structure. The cleansed crack is filled with the substrate material. Then the coated crack is exposed for a certain period of time to increased temperature and isostatic pressure, without the microstructure of the substrate being changed.

U.S. Pat. No. 5,666,643 discloses a method performed by means of brazing for repairing components consisting of cobalt and nickel-based superalloys. In this method a brazing material consisting of two components is used. One component of said brazing material forms the (actual) braze alloy, and its other component is formed by particles which are high-melting and which are either single-crystalline, directionally solidified or polycrystalline. In this composition, the microstructure of the repaired crack varies from that of the substrate, adversely affecting the interior space of the filled cracks, especially if the cracks are positioned in areas having stress concentrations.

Similar problems result from repair methods in which the microstructure of the substrate is not reconstructed, as, for instance, in the context of methods known from U.S. Pat. No. 4,381,944 or U.S. Pat. No. 5,437,737. In these methods each braze alloy is provided with an additive material in order to increase the solidity of the filled gap.

The method disclosed in U.S. Pat. No. 5,156,321 takes a different approach in that it uses a sintering process in order to make the repair more effective.

Two similar brazing methods are disclosed in U.S. Pat. No. 4,830,934 and U.S. Pat. No. 5,240,490 which are to be used for polycrystalline or directionally solidified superalloys, as described in U.S. Pat. No. 4,288,247. Here, the repair system consists of at least three different powdered metals. These different powdered metals fulfill different functions. The powdered metal of the first group are high-melting and have a relatively high proportion of Mo, Re and W. During the brazing process, these powdered metals are not melting, or are melting only partially. The powdered metals of a second and the remaining third group cause the brazing system to have a respective flow behavior. Here, the powdered metals of the second group contain B and/or Si as melting point reducers, and the powdered metals of the third group exhibit eutectic compositions and support as liquid phase the filling during the brazing process. Solidification is caused by an isothermal brazing process, followed by a gradual diffusion cycle, achieving, however, no single-crystalline filling of the gap. Here, modular conception allows for flexible handling of the microstructure of the gap and the mechanical characteristics, which definitely achieve the characteristics of the substrates.

Similar modular conception is disclosed in US 2002/0157737 A1. According to this disclosure, a low-melting powder, which contains up to 1% Ti, W, Re, Mo, Nb, Hf, Pd, Pt, Ir, Ru, C, Si and/or Zr, is mixed with at least one high-melting powder. Here, the brazing temperature amounts to 1260° C. (10-40 min.), again followed by a gradual diffusion cycle. It appears that the creep-rupture strength is close to that of the substrate.

According to the disclosure of EP 1 226 896 A2, René 80 powder is mixed with a ternary eutectic braze alloy, which contains approximately 15% Cr, 3.5% B and additionally up to 1.5% Fe. The mixing ratio amounts to 65:35 in favor of René 80. The brazing temperature ranges between 1175° C. and 1215° C. and is maintained for approximately 20 minutes. This produces a brazed seam having a polycrystalline microstructure. Different techniques can be used to apply the repair part to the component, for example, paste, putty or pre-sintered sheets. Pre-sintered sheets, for example, can be produced in such a way that superalloy metal sheets are produced in powder-metallurgical manner, as disclosed in GB 2153845 A.

U.S. Pat. No. 6,325,871 discloses an isothermal brazing cycle by means of which components consisting of cast superalloys can be connected. For this purpose, foils are used which have a boracic concentration of between 1 and 3 wt %.

A similar method is known from U.S. Pat. No. 6,508,000 regarding inserts. This pamphlet discloses a brazing process (limited to gap widths of up to 25 μm) by temporarily controlled liquid phase by means of which turbine blades and guide vanes can be repaired.

A further approach is disclosed in U.S. Pat. No. 6,968,991 regarding single-crystalline components. Here, the brazing material is applied in the form of a viscous mass (paint), consisting of brazing material, additive material, binding agent and a substrate, to the crack having a maximum width of 0.05 mm, which has previously been closed and spot welded. The brazing process in itself requires up to 20 minutes and is performed at a temperature of 1204° C. After a subsequent process of heat dissipation to 816° C. another heating process to 1204° C. takes place, so that the melting point reducers from the crack diffuse into the base material.

U.S. Pat. No. 6,629,368 discloses especially an isothermal brazing repair of single-crystalline turbine blades which seems to reconstruct a single-crystalline structure in the brazed areas. According to U.S. Pat. No. 6,629,368, this composition has the disadvantage that it involves the danger of damaging the base material. It is also inefficient because it involves long processing times.

U.S. Pat. No. 6,629,368 also discloses a method according to which an isothermal epitaxic process of curing cracks on single-crystalline materials has been provided.

The compositions known from U.S. Pat. No. 4,830,934 or U.S. Pat. No. 5,240,491 or U.S. Pat. No. 5,732,467 or U.S. Pat. No. 5,666,643 or U.S. Pat. No. 4,381,944 or U.S. Pat. No. 5,437,737 have the disadvantage that, after the repair, the components do not have the original mechanical strength, oxidation resistance and re-melting temperature or that, after the repair, the quality of the components has considerably deteriorated with regard to the above-mentioned criteria.

Against this background, the invention has the objective of providing an appropriate possibility to join and/or repair components in the field of aircraft engines or turbines. By means of this possibility the mechanical and physical characteristics in the range of joining and repairing will not be adversely affected, or at least only to a relatively small degree.

SUMMARY

Based on the invention, a special method has been suggested, especially a high-temperature brazing method for the purpose of producing or repairing in particular single-crystalline turbine or engine components, which method features the following steps: heating a braze filler metal to a temperature which is greater than or equal to the melting temperature of this braze filler metal; placing the molten mass of braze filler metal produced during the heating process into a crack which has formed in the turbine or engine component, or into a gap which has formed between two turbine or engine components, or into an area of a turbine or engine component which has been damaged especially through material abrasion; and non-isothermal controlling or regulating of the temperature of the braze filler metal during an epitaxic solidification process of said braze filler metal.

In the sense of the present disclosure or invention, a braze filler metal is a braze alloy, or a multi-component brazing system which features as components of the multi-component brazing system one braze alloy and at least one, as, for example, exactly one or exactly two or exactly three or more than three, additive material(s), or which consists of a braze alloy and at least one, as, for example, exactly one or exactly two or exactly three or more than three, additive material(s).

By means of such a method, which is especially based on a non-isothermal, epitaxic solidification process of said braze filler metal in a crack or in a gap or in a damaged area of a component or material, as, for example, a nickel-based alloy, the solidification process of braze filler metal can be reduced as compared to known methods in which the solidification process occurs in isothermal manner, at least with regard to significant gap widths which are, for example, greater than or equal to 200 μm. Especially with single-crystalline substrates or single-crystalline components to be repaired, such as, single-crystalline turbine or engine components or single-crystalline turbine blades, the invention-based method provides an excellent basis for the fact that, even after the repair, the repaired area has a single-crystalline or at least a directionally solidified structure, thus reconstructing to a great extent the mechanical and physical characteristics.

For example, the braze filler metal can be used in the form of a viscous paste or inserted in the crack of gap or applied to the damaged areas. The viscosity can be achieved, for example, by mixing the powdered metal with an organic binding agent. For example, the proportion of the binding agent can amount to between 5 and 15 wt %, in particular between 5 and 10 wt %, or between 8 and 12 wt %, especially preferable basically 10% of the powdered mixture.

In an advantageous modification of the invention-based method, the epitaxic solidification of the braze filler metal occurs with or at decreasing, especially at strictly monotonic decreasing, temperatures of the specimen or the turbine or engine components or the braze filler metal. In an advantageous composition the temperature decreases in linear manner. The heat dissipation or decrease of temperature during the process of epitaxic solidification occurs in a controlled or regulated manner.

According to an especially preferred embodiment, the heat dissipation in the invention-based method, particularly during high-temperature brazing, that is, even during epitaxic brazing, is controlled by means of high-vacuum furnace control. Here, target values can be provided by means of a computer program, and the actual value can be determined or measured by means of thermo-elements at the specimen or the component or the turbine or engine component or in the area of the braze filler metal (for reasons of simplification, the above-mentioned listing will subsequently also simply be referred to as specimen). Preferably, the specimen is not actively cooled down, whereas the heat dissipation is caused by means of a natural heat loss of the specimen (radiant heat), if the heat source, especially the heater, is turned off. In order to set up, control or regulate a specific or predetermined cooling rate, it is possible to counter-heat if the cooling rate is too high. Heating can occur through radiant heat emitted by heating elements.

It has to be noted that the furnace control mentioned is merely used as an example. It is, for example, possible to provide other heat sources or other heat transmissions, as, for example, during the soldering process under a glass guard, heat transmission occurs by means of gas molecules (kinetics) or during the process of inductive welding, heat transmission occurs through induction.

In an advantageous embodiment, the temperature decreases according to the invention-based method (as mentioned) during the epitaxic solidification process. However, it decreases with a lower cooling rate than it does after the epitaxic solidification process.

For instance, during the epitaxic solidification process, the cooling rates can range between 100 K/min. and 0.001 K/min., preferably between 20 K/min. and 0.01 K/min., preferably between 10 K/min. and 0.01 K/min., preferably between 5 K/min. and 0.08 K/min. During the cooling process after the epitaxic solidification process, cooling rates are especially preferred if they are smaller than 100 K/min/, preferably smaller than 80 K/min., preferably smaller than 60 K/min., preferably smaller than 40 K/min., preferably smaller than 20 K/min., preferably smaller than 10 K/min., preferably smaller than 5 K/min., preferably smaller than 2 K/min., whereas the cooling rate can be constant or non-constant.

The braze filler metal to be used for the method can consist, for example, of a braze alloy which has a composition according to the following table:

| | Element | | | | | | | | | | | |
|---|---|---|---|---|---|---|---|---|---|---|---|---|
| | Ni | Cr | Co | Mo | Al | Ta | Nb | Y | Hf | Pd | B | Si |
| Proportion in wt % | Bal. | 5-17 | 8-15 | 1-5 | 2-8 | 0-8 | 0-2 | 0-1 | 0-4 | 0.5-4 | 0.5-2 | 0-1 | or according to the following table:

| | Element | | | | | | | | | | | |
|---|---|---|---|---|---|---|---|---|---|---|---|---|
| | Ni | Cr | Co | Mo | Al | Ta | Nb | Y | Hf | Pd | B | Si |
| Proportion in wt % | Bal. | 5-17 | 8-15 | 1-5 | 2-8 | 0-8 | 0.1-2 | 0.1-1 | 1-4 | 0.5-5 | 0.5-2.5 | 0.1-1 | or according to the following table:

| | Element | | | | | |
|---|---|---|---|---|---|---|
| | Ni | Cr | Co | Ta | Al | B |
| Proportion in wt % | Bal. | 14.5-15.8 | 9.5-11 | 3-3.8 | 3.2-3.7 | 2.1-2.5 | whereas the last example corresponds to the commercial braze filler metal D-15.

By means of Bal., it is shown that especially through this, in this case through nickel (Ni), the sum of the weight proportions shall be or will be supplemented to an amount of 100%.

In an advantageous embodiment it can be arranged that the braze filler metal has an additive material on a nickel-base, which additive material has, besides nickel, for example, one or several of the following elements:

| | Element | | | | | | | | | | | | | | | |
|---|---|---|---|---|---|---|---|---|---|---|---|---|---|---|---|---|
| | Cr | Co | W | Mo | Al | Ta | Ti | Re | Fe | Nb | Y | Hf | Pd | C | B | Si | Ni |
| Proportion in wt % | ≤30 | ≤20 | ≤15 | ≤10 | ≤10 | ≤10 | ≤10 | ≤10 | ≤5 | ≤5 | ≤5 | ≤5 | ≤5 | ≤1 | ≤1 | ≤1 | Bal | or has one or several of the following elements:

| | Element | | | | | | | | | |
|---|---|---|---|---|---|---|---|---|---|---|
| | Cr | Co | W | Mo | Al | Ti | C | Zr | B | Ni |
| Proportion in wt % | 13.7-14.3 | 9-10 | 3.7-4.3 | 3.7-4.3 | 2.8-3.2 | 4.8-5.2 | 0.15-0.19 | 0.03-0.1 | 0.01-0.02 | Bal |

BRIEF DESCRIPTION OF THE DRAWINGS

FIG. 1 a temperature sequence which can be arranged in an exemplary invention-based method;

FIG. 2 exemplary compositions of materials which can be used in the context of an invention-based method, in particular with the exemplary invention-based method described in FIG. 1 or FIG. 3;

DETAILED DESCRIPTION

Figure 3:
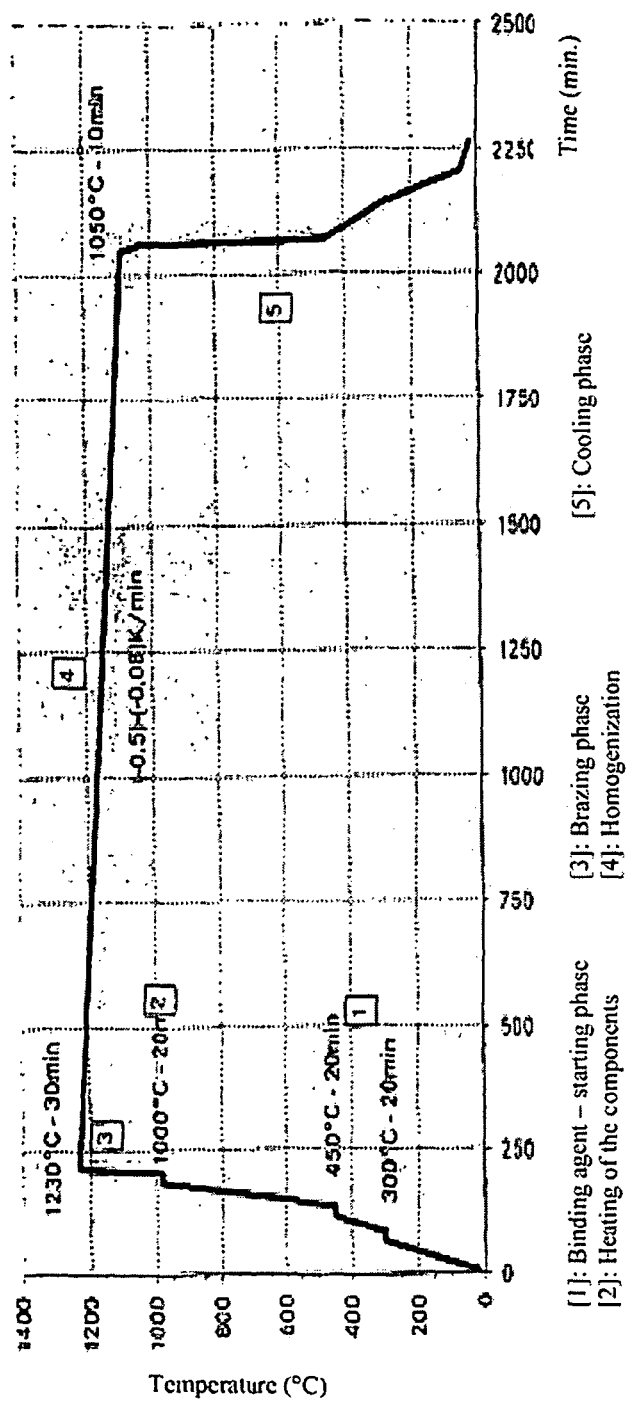
FIG. 3 a further exemplary temperature sequence which can be arranged in a further exemplary invention-based method.

FIG. 1 shows an exemplary temperature-time-sequence 1 for a braze filler metal which can be arranged in the context of an exemplary invention-based brazing or repair method or an exemplary invention-based braze repair for nickel-based materials or for turbine blades consisting of a nickel-based material. Here, the nickel-based material or the turbine blade consisting of a nickel-based material can be arranged in single-crystalline or poly-crystalline or directionally solidified manner.

This method is here explained by means of an example according to which the nickel-based material or the turbine blade has a crack or gap to be cured or filled, or has an area to be cured which has, for example, a width or height of up to 500 μm.

For example, the braze filler metal can be a nickel-based boracic braze filler metal. Here, the boron is used as melting point reducer and has in nickel high mobility. In addition, the braze filler metal can contain palladium which also is a melting point reducer and which increases also the edge-zone solubility of boron in the ternary Ni—Pd—B-system. Furthermore, the braze filler metal can contain one, several or all the γ' creators Al, Nb and Ta so that, following the non-epitaxic solidification process (which will be subsequently discussed), a precipitation hardening can be performed and will be performed in a preferred embodiment with an appropriate heat treatment.

With regard to exemplary braze filler metals, to which possibly an additive material has been or will be added, one of the materials provided can be, for example, that which the applicant disclosed in DE 103 56 562 A1, paragraphs [0006] through [0069] or in claims 1 through 23. For this purpose, by making reference to them, the passages of DE 103 56 562 A1 addressed are used as subject matter of the present disclosure. In this context, the applicant explicitly reserves for herself the right to claim compositions of the present invention as further modifications, in which compositions the materials disclosed in the named passages of DE 103 56 562 have been arranged to be braze filler metals.

For example, it can be arranged that the braze filler metals have a composition according to the following table:

| | Element | | | | | | | | | | |
|---|---|---|---|---|---|---|---|---|---|---|---|
| | Ni | Cr | Co | Mo | Al | Ta | Nb | Y | Hf | Pd | B | Si |
| Proportion in wt % | Bal. | 5-17 | 8-15 | 1-5 | 2-8 | 1-8 | 0.1-2 | 0.1-1 | 1-5 | 0.5-5 | 0.5-2.5 | 0.1-1 |

By means of Bal., it is shown that especially through this, in this case through nickel (Ni), the sum of the weight proportions shall be or will be supplemented to an amount of 100%.

An especially advantageous composition of braze filler metal is described in line two of the table according to FIG. 2 (A2 braze alloy).

The braze alloy can or will be supplemented with an additive material. For example, said additive material can be arranged on a nickel base. It can be arranged that the proportion of additive material which has been added to the braze alloy is greater than 20 wt %, preferably greater than 25 wt %, preferably between 20 and 60 wt %, preferably between 25 and 50 wt %, preferably between 30 and 50 wt %, preferably between 40 and 50 wt %, especially preferred 50 wt % of the braze filler metal. For example, the additive material can consist of René 80, the composition of which is described in line 3 of FIG. 2.

As already mentioned, the substrate, i.e., the material to be cured, or the turbine blade, is a nickel-based material. The substrate, i.e., the material to be cured, or the turbine blade, can also be a poly-crystalline, columnar directionally solidified or single crystalline material. However, it has to be noted that particular advantages of the method have an effect only with columnar directionally solidified or single-crystalline materials.

The exemplary temperature-time-sequence 1 according to FIG. 1 refers (at least with respect to the temperature and time values mentioned), for example, to materials or substrates or components or turbine blades, or is optimized for a single-crystalline nickel-base superalloy René N-5. The composition of such nickel-base superalloy René N-5 is shown in FIG. 2 in the last line. However, it has to be noted that the method can be used also, for example, for a columnar directionally solidified alloy or single-crystalline superalloy, in particular nickel-base alloy.

According to an exemplary invention-based method as, for example, especially a method of which FIG. 1 shows the sequence of temperature control for non-isothermal (i.e., preferably decreasing temperature) epitaxic brazing of nickel-base materials, initially the braze filler metal is heated to a temperature which is greater than or equal to the melting temperature of said braze filler metal. It is especially heated to a temperature in which the braze filler metal is partially or completely available in molten form.

Subsequently, the molten mass of the braze filler metal produced by heating is filled into crack or formed in the turbine or engine component, or into a gap formed between two turbine or engine components, or it is applied to an area to be repaired. Such application can be performed at the time of heating or overlapping the time of heating, however, alternatively, it can also be performed after the time of heating.

As shown with the temperature-time-sequence 1 according to FIG. 1, the heating process there occurs in a way that the temperature achieved ranges between 1200° C. and 1260° C. in order to melt the braze filer metal completely and to fill the gap with the molten mass. The reference number 10 in FIG. 1 shows the area of heating. For example, complete liquidation can be achieved, if the melting temperature is being maintained for 15 to 45 minutes. This is shown in FIG. 1 in area 12. Alternatively, it can be arranged that such maintaining the melting temperature is abandoned, or that maintaining the temperature, which occurs after the process of heating and prior to epitaxic solidification process, takes place for a time period which differs from the time period mentioned above. If such maintaining of the temperature has been arranged, it has been arranged especially that the period of maintaining the temperature is shorter than the subsequent epitaxic solidification process. For example, it can be arranged that the period of maintaining the temperature requires less than 50%, preferably less than 40%, preferably less than 30%, preferably less than 20%, preferably less than 10%, preferably less than 5%, preferably less than 3%, preferably less than 1% of the time period which the solidification process requires or an associated period of cooling.

In the subsequent epitaxic solidification process of the braze filler metal mentioned above, the temperature of the braze filler metal is carried or controlled in non-isothermal manner. Especially the epitaxic solidification process is carried in non-isothermal manner by having constant heat dissipation (for example in the form of a ramp) from the melting temperature so that the material in the crack or gap solidifies homogenous, i.e., without eutectic islands. In the exemplary invention-based method of which FIG. 1 shows the temperature-time-sequence 1, the non-isothermal epitaxic solidification occurs within a period of between 2 and 25 hours. In this example, the temperature of the braze filler metal is cooled down to between 1050° C. and 1200° C.

The area with the reference number 14 in FIG. 1 provides a diagram of the non-isothermal temperature control during the process of epitaxic solidification.

The process described or the process of epitaxic solidification according to the exemplary invention-based method brings about three effects in particular:

The first effect involves that, similar to the isothermal epitaxic process, the boron is diffused into the base material. The second effect involves that the edge-zone solubility of the boron is increased in nickel up to a temperature of 1093° C. The third effect involves that melting-point decreasing elements accumulate in the molten mass and this accounts for a decreasing of the liquidus temperature.

As indicated in area 16, after the process of epitaxic solidification, the temperature is restored to the surrounding temperature, which can take place in controlled or uncontrolled manner.

Especially the embodiment shows a structure-conform, non-isothermal brazing repair of single-crystalline turbine blades. With the application of this brazing method, the repaired areas have again a single-crystalline structure and, consequently, the associated high mechanical strength, oxidation resistance and re-melting temperature. For example, compared to the composition according to U.S. Pat. No. 6,629,368 B1, the temperature stability is not isothermal, but it is isothermal with decreasing temperature, considerably expediting the brazing process.

According to prior art, with the application of previously established brazing methods in the field of aircraft turbines, turbine components consisting of single-crystalline nickel-based alloys having thermal fatigue cracks and material abrasion as operational damage symptoms do not have a single-crystalline structure.

Therefore, after being repaired, they also do not have the original mechanical strength, oxidation resistance and re-melting temperature. However, according to the embodiment described in FIG. 1 of the present invention, the single-crystalline structure and, consequently, also the mechanical and physical characteristics are reconstructed as far as possible.

At least the invention-based brazing method described by means of the embodiment is based on a non-isothermal, epitaxic solidification of the braze filler metal in a crack or gap or on a surface of a nickel-based alloy so that the crystalline structure, i.e., direction and lattice of the crystal of the substrate, is being absorbed. Isothermally directed epitaxic solidification process belong to prior art. However, they have the disadvantage that the solidification processes for significant gap widths, for example, gap widths of 200 μm, are extremely time-consuming since here merely the boron is diffused out of the gap in order to increase the liquidus temperature. Since elements accumulate in the molten mass at the beginning of solidification, which elements result in decreasing liquidus temperature, it is advantageous to follow up the brazing temperature by means of a ramp in order to expedite the solidification process, even without completely diffusing the boron from the gap.

As shown especially in the embodiment, the invention offers several advantages. By applying the exemplary invention-based method, the braze filler metal structures in the repaired areas have again a single-crystalline structure which, accordingly, has the associated high mechanical strength, oxidation resistance and re-melting temperature.

Because of the fact that temperature control is performed in non-isothermal manner with decreasing temperature, the brazing process is considerably expedited. As a result, the single crystalline base material of turbine components is less thermally stressed and damaged and, in addition, the brazing process more economical because if its shorter processing periods.

During the epitaxic solidification, it has been especially arranged (see area 14) that the temperature or brazing temperature occurs in non-isothermal manner and decreases, that is, it decreases especially in strictly monotonic manner.

The invention claimed is:

1. A method of producing or repairing single-crystalline turbine or engine components by means of the following steps:
   heating of braze filler metal at a constant temperature rate to a peak temperature of 1200 to 1260° C., which is greater than or equal to the melting temperature of the braze filler metal;
   maintaining the braze filler metal at the peak temperature for 15 to 45 minutes;
   introducing a molten mass of the braze filler metal produced through the heating process into one of a crack formed in the turbine or engine component, a gap formed between two turbine or engine components, or a damaged area of a turbine or engine component; and
   non-isothermal control of the temperature of the braze filler metal or turbine or engine component by cooling the braze filler metal at a constant temperature rate during an epitaxic solidification process of said braze filler metal.

2. The method according to claim 1, wherein the temperature of the braze filler metal during the epitaxic solidification process of said braze filler metal is controlled in a non-isothermal manner such that the temperature of the braze filler metal during the epitaxic solidification process decreases in strictly a monotonic manner.

3. The method according to claim 2, wherein the temperature of the braze filler metal during the epitaxic solidification process of said braze filler metal is controlled in a non-isothermal manner such that the temperature of the braze filler metal during the epitaxic solidification process decreases in the form of a ramp or in a linear strictly monotonic manner.

4. The method according to claim 1, wherein the constant or average cooling rate of the braze filler metal during the epitaxic solidification process is between 100 K/min, and 0.001 K/min.

5. The method according to claim 1, wherein, after heating the braze filler metal to a temperature which is greater than or equal to the melting temperature of the braze filler metal and prior to the epitaxic solidification process of the braze filler metal, the temperature is maintained for a pre-determined time period for the purpose of complete melting or increasing the proportion of the molten mass.

6. The method according to claim 1, wherein the braze filler metal consists of a braze alloy including an additive material, whereas the weight proportion of the additive material in the mixture of the braze alloy and the additive material is between 0.001 wt % and 99 wt %.

7. The method according to claim 1, wherein the braze filler metal consists of a braze alloy to which an additive material has been added, whereas the weight proportion of the additive material of the mixture of braze alloy and additive material is between 25 wt % and 50 wt %.

\* \* \* \* \*